Patented Apr. 19, 1949

2,467,789

UNITED STATES PATENT OFFICE 2,467,789

ZINC SALTS OF AROMATIC MERCAPTANS AS PROCESSING AGENTS FOR RUBBERS

John J. Verbanc, Tuxedo Park, Del., assignor to E. I. du Pont de Nemours & Company, Wilmington, Del., a corporation of Delaware No Drawing. Application November 16, 1944, Serial No. 563,805

6 Claims. (Cl. 260—30.8)

This invention relates to the processing of elastomeric materials and to agents for improving the processability of elastomers, particularly those of the butadiene-styrene type and natural rubber.

The fact that the butadiene-styrene interpolymers such as the government rubber known as "GR-S" do not break down well on continued mastication, has made the conversion from the use of natural rubber to the synthetic products extremely difficult. The lack of plasticization of the GR-S rubbers on milling causes a material increase in the overall milling time, for the compounding ingredients must be added very slowly in order that they be dispersed properly in the elastomer and to prevent the compounded elastomer from becoming lacy and falling off the mill. As a result, the output of finished product from this synthetic elastomer per unit of time is materially decreased with respect to the former output of compounded rubber from the same machinery.

While a number of substances have been proposed as softeners and plasticizers for natural and synthetic rubbers, most of the substances used heretofore, when applied to the interpolymers of butadiene-styrene, do not give the desired improvement in milling and processing characteristics even though they may improve the plasticity of the product.

In copending application Serial No. 504,761, now U. S. P. 2,378,519, a method is disclosed for improving the processability of elastomers by intimately incorporating in the elastomer a zinc salt of an aromatic mercaptan of the benzene and naphthalene series. In that application it is pointed out that not only the plasticity is improved but the milling and processing characteristics of the GR-S rubber are materially improved, and it is shown that, insofar as the butadiene-styrene interpolymers are concerned, the plasticity is not necessarily correlated with the processability or millability of that elastomer, although with natural rubber these properties are generally correlated.

It is an object of the present invention to provide processing agents which, when added in small amounts to elastomeric materials and more particularly to those of the butadiene-styrene type, will materially decrease the time required for milling such elastomer and will also greatly decrease the overall time required for the addition of the compounding agents thereto. A further object of the invention is to provide a processing agent which, when added to the butadiene-styrene elastomers, will increase their plasticity sufficiently to impart thereto better molding properties and extrusion characteristics. A still further object of the invention is to produce a processing agent which will act at relatively low temperatures so that the synthetic elastomers may be worked on the usual design of rubber-working equipment.

I have found that, by the addition of from 0.05% to 5% of a composition consisting of a zinc salt of an aromatic mercaptan of the benzene or naphthalene series dissolved in an equal weight of an organic solvent, or a corresponding amount of a solution of other concentration, to the raw elastomers such as the butadiene-styrene interpolymer, the milling and processing characteristics, as well as the plasticity of the resulting elastomer, are materially improved. The processing or mastication of the elastomer in the presence of this processing agent may be carried out in the standard rubber processing equipment such as the Gordon plasticator, Banbury mixer or on the conventional rubber mill.

By dissolving the zinc salt of the aromatic mercaptan in an organic solvent, the activity of the zinc salt is materially increased. This increased effectiveness cannot be explained merely on the basis of the solvent acting as a diluent, for the solvent usually vaporizes during the milling and does not remain in the polymer. Furthermore, the amount of solvent employed is so small that no appreciable softening action can be expected from it alone.

The solutions of the zinc salts of the aromatic mercaptans may be prepared either by dissolving the dry mercaptide in the solvent or by reacting zinc oxide with the desired mercaptan in the solvent, as more particularly described in my copending application Serial No. 563,806, now U. S. Patent 2,413,531, issued December 31, 1946. The effect on millability, plasticity, etc., is the same in either case. The solutions of the zinc mercaptides may contain from 5% to 75% of the salt, although solutions containing from 30% to 60% are preferred, with a 50% solution being most conveniently used. The amount of the dissolved zinc mercaptide to be employed, irrespective of the amount of solvent in which it is dissolved, is preferably between 0.05 to 2.5%, based on the weight of the elastomer, the preferred amount being between 0.25% and 2.0%.

Any of the usual methods employed for the incorporation of compounding agents into elastomers may be used for introducing the solutions of the zinc mercaptides into the elastomers. They may be added on either a hot or cold mill or in a hot or cold Gordon plasticator or Banbury mixer. Any of these methods of mixing will produce a plastic mass into which compounding ingredients may be incorporated with ease.

The solvents which may be employed are the neutral oxygenated organic solvents or mixtures of the same, such as alcohols, ketones, keto-alcohols, cyclic ethers, aliphatic ethers or mixtures of these oxygenated solvents with hydrocarbon solvents such as xylene, benzene, gasoline, kerosene, hexane, etc. The mixtures may vary considerably without seriously affecting the stability of the solution or the plasticizing action of the zinc aryl mercaptide dissolved therein. It has been found possible to vary the composition of such mixtures from 10 parts by weight of the oxygenated solvent with 90 parts of a hydrocarbon solvent to 90 parts of oxygenated solvent with 10 parts of hydrocarbon solvent. The preferred solvent mixtures of the oxygenated and hydrocarbon solvents are those which contain from 25 to 75 parts of the oxygenated solvent.

Typical of the zinc aryl mercaptides which show improved properties as processing agents when dissolved in various oxygenated organic solvents is the zinc xylyl mercaptide. The effect of adding the organic solvent solution of this mercaptide to a standard sample of GR-S (butadiene-styrene interpolymer) is shown in the following Table I. The decreases in milling time caused by incorporation of the solution of the zinc xylyl mercaptide is taken as a measure of improvement in millability in this class of elastomer. The milling time as reported in this table and elsewhere in this description is determined as follows:

A 50 gram sample of the elastomer is placed on a laboratory mill having rolls 6 inches long and 2 inches in diameter, both running at the same speed, separated 0.030 inch. These rolls are kept at a temperature of 70° C. throughout the test. The band on the mill roll is cut a definite number of times at stated intervals of time, to insure thorough mixing, for example, it is often convenient to cut the band four times each way at 5 minute intervals during the test. The milling is continued until the band is free of holes for at least the time required for one revolution of the front mill roll. The time in minutes elapsing between the start of milling and the development of a band free of holes, is taken as a measure of millability. When a chemical agent is to be tested as a processing agent, such agent is added immediately after the elastomer is placed on the mill, and addition is accomplished as quickly as possible. The conditions of this test differ from actual plant conditions only in the size of equipment used. Throughout this specification the term "millability" refers to the milling time, in minutes, required in this test.

The solutions of zinc xylyl mercaptide used in these tests were prepared by heating equal weights of the desired solvent and the metal salt at 40° to 50° C. with good agitation and in such a manner that practically no solvent was lost due to vaporization. The resulting clear solutions were then evaluated as processing agents.

TABLE I

*Solutions of zinc xylyl mercaptide as millability improvers of GR-S [1]*

| Ex. No. | Solvent Employed | Percent Zinc Mercaptide in Solution | Percent Solution Based on Elastomer | Millability at 70° C. |
|---|---|---|---|---|
| 1 | None | None | None | 60.0 |
| 2 | do | 100 | [2] 4 | 23.5 |
| 3 | Isobutanol | 50 | 4 | 14.5 |
| 4 | Isopropanol | 50 | 4 | 24.5 |
| 5 | Lorol | 50 | 4 | 18.5 |
| 6 | beta-methoxy ethanol | 50 | 4 | 22.5 |
| 7 | Cellosolve | 50 | 4 | 14.5 |
| 8 | Methyl-ethyl Ketone | 50 | 4 | 10.0 |
| 9 | Diacetone Alcohol | 50 | 4 | 16.5 |
| 10 | Cyclohexanol | 50 | 4 | 17.0 |
| 11 | Mesityl Oxide | 50 | 4 | 22.0 |
| 12 | Dioxane | 50 | 4 | 16.5 |
| 13 | Terpineol | 50 | 4 | 13.5 |
| 14 | Isofenchone | 50 | 4 | 14.0 |

[1] GR-S (an interpolymer of butadiene and styrene prepared by polymerization of approximately 75 parts of butadiene and 25 parts styrene.)
[2] Dry powder.

As illustrated in Table I, the zinc xylyl mercaptide, when used in solution, is considerably more effective in improving the millability of GR-S than when used alone. In nearly every case 2 parts of zinc xylyl mercaptide in solution gave superior results to 4 parts when used alone.

The liquid in each case dispersed completely and uniformly throughout the batch of polymer and appeared to do so regardless of the speed of addition. This is of extreme importance in using GR-S, since most chemicals disperse poorly, causing the resulting vulcanizate to have inferior properties.

In order to show the applicability of our processing compositions in various types of butadiene-styrene interpolymers, and the advantages to be gained over the use of the pure zinc salt, a series of tests were carried out employing samples of GR-S produced by several companies associated with the United States Government's Synthetic Rubber Program. The milling test used was the same as that previously described. The millability data obtained is listed in Table II.

TABLE II

*Millability in minutes at 70° C.*

| Manufacturer | Blank | 4% Zinc Xylyl Mercaptide (100%) | 4% of a 50% Isopropanol Solution of Zinc Xylyl Mercaptide |
|---|---|---|---|
| A | 60 | 23.5 | 24.5 |
| B | 65 | 24.0 | 17.0 |
| C | 90 | 70.0 | 75.0 |
| D | 120 | 45.0 | 30.0 |

This comparison indicates that solutions of the zinc salt of xylyl mercaptan are very effective in reducing the processing time of GR-S in spite of differences in the manufacturing history of the elastomer.

The zinc salts of other mercaptans, when dissolved in an organic solvent, have also been found to be effective in improving the processing of butadiene-styrene polymers. Employing a sample of GR-S produced by Manufacturer B, several solutions of zinc mercaptides were evaluated as processing agents. The results obtained are recorded in Table III.

TABLE III

*Millability of GR-S* [1]

| Ex. No. | Zinc Salt Used | Solvent Employed [2] | Millability at 70° C. |
|---|---|---|---|
| 1 | None | None | 60 |
| 2 | Zinc xylyl mercaptide | do | 23 |
| 3 | do | Isopropanol | 25 |
| 4 | do | Cellosolve | 30 |
| 5 | Zinc thio-alpha-naphtholate | do | 23 |
| 6 | Zinc thio-beta-naphtholate | do | 9.5 |
| 7 | Zinc thio-phenolate | do | 23 |

[1] GR-S from Manufacturer B.
[2] Solutions containing 50% active ingredient were employed. 4% of each solution, based on the elastomer, were employed except in the case of zinc thio-phenolate, where 8% was employed since this solution only contained 25% active ingredient. 4% of zinc xylyl mercaptide was employed in Ex. 2.

As illustrated in Table III, the solutions of various zinc mercaptides are all extremely effective as processing agents for GR-S as indicated by the improvement in milling time. Examination of the plasticized polymer indicates that the liquid material disperses throughout the whole mass and exhibits a maximum plasticizing effect, probably because of better contact. It has also been found that the liquid products may be added very rapidly if desired, with no loss in either the plasticizing effect or in the physical properties of the resultant vulcanizates. However, in the case of the pure solid it has been found that too rapid addition results in poor dispersion. The poor dispersion produces localized spots of plasticization which are detrimental in that vulcanizates produced from such a plasticized stock are non-uniform in physical characteristics.

The efficacy of a 50% solution of zinc xylyl mercaptide, prepared according to the process of Example 1 of my copending application Serial No. 563,806 now U. S. Patent 2,413,531 issued December 31, 1946, by reacting zinc oxide with xylyl mercaptan in a mixed solvent composed of 50 parts of xylene and 50 parts of isopropanol, was tested on a 30 inch rubber mill, using GR-S prepared by Manufacturer A. The mill-roll temperature was regulated at 70° C. with a mill setting of 0.040 inch. The plasticity-recovery data listed in Table IV was obtained on a Williams parallel plate plastometer which measures the thickness in thousandths of an inch of a pellet after 3 minutes' deformation at 80° C. under a load of 5000 grams. The pellet used has a volume of 2 cc. and an original thickness of 0.4 inch. The recovery is measured at room temperature one minute after removing the weight from the pellet, and is the difference in thousandths of an inch between the recovered thickness of the pellet and the plasticity number. (Williams, Ind. Eng. Chem., 16, 362 (1924).)

TABLE IV

*Williams plasticity-recovery measurements 10 lbs. GR-S on a 30" laboratory mill*

| Time of Milling in Minutes | No Plasticizer | | | | 1 Part of a 50% solution zinc xylyl mercaptide in solvent [1] | | | |
|---|---|---|---|---|---|---|---|---|
| | Plasticity | | Recovery | | Plasticity | | Recovery | |
| | 1 | 2 | 1 | 2 | 1 | 2 | 1 | 2 |
| 5 | 140 | 138 | 146 | 140 | 130 | 130 | 100 | 100 |
| 10 | 125 | 121 | 106 | 104 | 114 | 112 | 10 | 10 |
| 15 | 117 | 113 | 103 | 102 | 107 | 103 | 10 | 9 |

1 and 2 represent check determinations.
[1] Solvent composed of 50 parts xylene and 50 parts isopropanol.

The comparisons in Table IV show that the organic solvent solution of zinc xylyl mercaptide, in addition to being a very efficient processing agent as indicated by improved millability of the polymers, is also a powerful plasticing agent, as indicated by the Williams plasticity-recovery data. This softening effect is beneficial in that it decreases the time necessary for compounding and produces stocks which extrude and mold better. The use of solutions of zinc aryl mercaptides makes possible the elimination of the relatively large volumes of oils, tars, coal tar softeners, and the like, which heretofore have been used in large quantities in GR-S to obtain a soft, extrudable stock. The use of large quantities of said materials are often harmful to the physical properties of the resulting vulcanizate, particularly tensile strength, tear strength and resistance to flex-cracking.

Plasticity data on other solutions of zinc xylyl mercaptide in which mixed solvents were used are listed in Table V. In these tests, 1% of plasticizing agent (solid or solution) was used on GR-S manufactured by producer A. The GR-S was milled on a laboratory rubber mill having rolls 12 inches long and 6 inches in diameter, using 400 grams of elastomer per batch, and with a mill roll temperature of 50° C. Each solution consists of equal weights of zinc xylyl mercaptide and mixed solvent. The combinations of solvents are shown in Table V. It will be seen that 0.5% zinc xylyl mercaptide in solution is substantially equal to 1% of the solid zinc xylyl mercaptide.

TABLE V

*Williams plasticity-recovery measurements*

| Solvent Combination | Time of Milling in Minutes | Plasticity | Recovery |
|---|---|---|---|
| Pure Zinc xylyl Mercaptide | 3 | 130 | 57 |
| | 5 | 129 | 40 |
| | 10 | 120 | 25 |
| | 15 | 111 | 15 |
| 50% Lorol, 50% Xylene | 3 | 130 | 85 |
| | 5 | 128 | 55 |
| | 10 | 120 | 25 |
| | 15 | 115 | 20 |
| 50% Dioxane, 50% Xylene | 3 | 135 | 52 |
| | 5 | 130 | 38 |
| | 10 | 120 | 25 |
| | 15 | 115 | 22 |
| 50% Methoxy Methoxy Ethanol, 50% Xylene | 3 | 133 | 75 |
| | 5 | 129 | 48 |
| | 10 | 123 | 30 |
| | 15 | 122 | 23 |
| 50% Isobutanol, 50% Xylene | 3 | 137 | 53 |
| | 5 | 131 | 37 |
| | 10 | 122 | 32 |
| | 15 | 116 | 20 |
| 50% Methyl Cellosolve, 50% Xylene | 3 | 134 | 49 |
| | 5 | 127 | 40 |
| | 10 | 118 | 28 |
| | 15 | 114 | 23 |
| 50% Terpineol, 50% Xylene | 3 | 133 | 80 |
| | 5 | 127 | 48 |
| | 10 | 120 | 39 |
| | 15 | 115 | 20 |

These solutions of zinc aryl mercaptides have also been shown to be very effective plasticizers for natural rubber, as illustrated by the following tests. 400 grams of smoked sheet rubber were placed on a rubber mill, with 12 inch rolls which were 6 inches in diameter, maintained at 100° C. and having an opening of 0.030 inch. After 3 passes through the mill, the mill opening was changed to 0.040 inch and the rubber allowed to form a sheet for 3 minutes. After 3½ minutes the plasticizing agent was added and the sheeted rubber cut from side to side (according to standard milling technique) once each minute. Small samples were removed at 9 minutes and 15 minutes milling. The plasticity pellets were aged from 16 to 24 hours at room temperature, and the plasticity-recovery data was obtained on a Williams parallel plate plastometer. The data obtained is listed in Table VI.

TABLE VI

*Williams plasticity-recovery measurements 400 grams natural rubber on a 6" x 12" laboratory mill*

Mill roll temperature 100° C.

| Time of Milling-Minutes | 0.5% RPA No. 3 [1] | | | | 0.4% Zinc Xylyl Mercaptide Solution [2] | | | |
|---|---|---|---|---|---|---|---|---|
| | Plasticity | | Recovery | | Plasticity | | Recovery | |
| | 1 | 2 | 1 | 2 | 1 | 2 | 1 | 2 |
| 3 | 176 | 171 | 50 | 44 | 181 | 180 | 57 | 56 |
| 9 | 123 | 121 | 7 | 6 | 135 | 133 | 12 | 12 |
| 15 | 107 | 106 | 3 | 3 | 108 | 106 | 5 | 3 |

1 and 2 are check determinations.
[1] RPA No. 3 = a 36.5% solution of xylyl mercaptan in an inert hydrocarbon solvent.
[2] A 50% solution of zinc xylyl mercaptide in a mixed solvent composed of 50 parts of isopropanol and 50 parts of xylene.

The above data (Table VI) indicate that a solution of zinc xylyl mercaptide is as effective as xylyl mercaptan in plasticizing natural rubber.

The aromatic solvent solutions particularly useful for the process of this invention are those containing zinc salts of aromatic mercaptans of the benzene and naphthalene series which contain no further functional group. The zinc salts of the simple substituted aryl mercaptans, such as those more particularly described in my copending application Serial No. 563,806, may be employed.

While the above examples more particularly illustrate the advantages obtained by the use of these new processing agents in the working of synthetic rubber of the GR-S type and in natural rubber, they may also be used to plasticize other types of artificial rubber such as the butyl rubbers (GR-I; isobutylene-conjugated diene hydrocarbon interpolymers), and the butadiene acrylonitrile interpolymers, etc.

The use of the solutions of this invention makes possible the break down of polymeric materials, e. g., GR-S and natural rubber, more completely and in a shorter period of time with an appreciable saving in power consumption and, consequently, a much greater output from each piece of rubber compounding equipment. The solutions of various zinc mercaptides have been shown to be considerably more effective in their plasticizing actions on polymeric materials than the pure solid. The materials outlined in this invention record disperse in elastomers much more readily than the solid mercaptides and provide, in addition to improved millability, considerable softening, which is extremely beneficial since it materially aids in dispersing additional compounding agents.

Polymeric materials plasticized with the compositions of this invention also dissolve more readily in organic solvents forming cements having a lower viscosity.

I claim:

1. The process for improving the processing characteristics of elastomers of the class consisting of natural rubber and butadiene polymer rubbers which comprises intimately incorporating in said elastomer by mixing operation from 0.25% to 2.5%, based on the weight of the elastomer, of a zinc salt of an aromatic mercaptan selected from the group consisting of mercaptans of the benzene and naphthalene series which is in solution in an inert organic solvent, the solvent consisting of from 10% to 100% of a neutral oxygenated organic solvent.

2. The process for improving the processing characteristics of butadiene-styrene elastomers which comprises intimately incorporating in said elastomer by mixing operation from 0.25% to 2.5%, based on the weight of the elastomer, of a zinc salt of an aromatic mercaptan selected from the group consisting of mercaptans of the benzene and naphthalene series which is in solution in an inert organic solvent, the solvent consisting of from 10% to 100% of a neutral oxygenated organic solvent.

3. The process for improving the processing characteristics of butadiene-styrene elastomers which comprises intimately incorporating in said elastomer by mixing operation from 0.25% to 2.5%, based on the weight of the elastomer, of the zinc salt of xylyl mercaptan which is in solution in an inert organic solvent, the solvent consisting of from 10% to 100% of a neutral oxygenated organic solvent.

4. The process for improving the processing characteristics of butadiene-styrene elastomers which comprises intimately incorporating in said elastomer by a mixing operation from 0.25% to 2.5%, based on the weight of the elastomer, of a zinc salt of a mercaptan of the benzene series which is in solution in an inert organic solvent consisting of from 10% to 100% of an alcohol.

5. The process for improving the processing characteristics of butadiene-styrene elastomers which comprises intimately incorporating in said elastomer by a mixing operation from 0.25% to 2.5%, based on the weight of the elastomer, of a zinc salt of a mercaptan of the benzene series which is in solution in an inert organic solvent consisting of from 10% to 100% of isopropanol.

6. The process for improving the processing characteristics of butadiene-styrene elastomers which comprises intimately incorporating in said elastomer by a mixing operation from 0.25% to 2.5%, based on the weight of the elastomer, of the zinc salt of xylyl mercaptan dissolved in an inert organic solvent, which solvent consists of from 10% to 100% of isopropanol.

JOHN J. VERBANC

REFERENCES CITED

The following references are of record in the file of this patent:

UNITED STATES PATENTS

| Number | Name | Date |
|---|---|---|
| 2,378,519 | Vincent | June 19, 1945 |
| 2,413,531 | Verbanc | Dec. 31, 1946 |

FOREIGN PATENTS

| Number | Country | Date |
|---|---|---|
| 390,532 | Great Britain | Apr. 7, 1933 |
| 428,456 | Great Britain | May 7, 1935 |
| 526,131 | Great Britain | Sept. 11, 1940 |